(12) United States Patent
Barrow

(10) Patent No.: US 6,526,762 B1
(45) Date of Patent: Mar. 4, 2003

(54) REFRIGERATED CONTAINER DISPENSER AND METHOD

(76) Inventor: Kincy L. Barrow, 310 Rosindale Rd., Clarkton, NC (US) 28433

( * ) Notice: Subject to any disclaimer, the term of this patent is extended or adjusted under 35 U.S.C. 154(b) by 0 days.

(21) Appl. No.: 10/100,128

(22) Filed: Mar. 18, 2002

Related U.S. Application Data

(62) Division of application No. 09/822,148, filed on Apr. 2, 2001, now Pat. No. 6,381,966.

(51) Int. Cl.[7] ................................................ F25D 3/08
(52) U.S. Cl. .......................... 62/62; 62/3.61; 221/150 R
(58) Field of Search ...................... 62/3.6, 3.61, 3.64, 62/244, 378, 457.4, 457.5, 62; 221/150 R, 194, 195, 279

(56) References Cited

U.S. PATENT DOCUMENTS

| | | | | |
|---|---|---|---|---|
| 3,916,639 A | * | 11/1975 | Atkinson | 165/41 |
| 4,236,749 A | * | 12/1980 | Schluns | 296/156 |
| 4,258,555 A | * | 3/1981 | Scharm et al. | 62/244 |
| 4,342,202 A | * | 8/1982 | Knutson | 222/146.6 |
| 4,510,770 A | * | 4/1985 | Vella | 221/281 |
| 4,765,151 A | * | 8/1988 | Bessey | 62/239 |
| 4,779,923 A | * | 10/1988 | Lang et al. | 296/37.8 |
| 5,203,833 A | * | 4/1993 | Howell | 165/41 |

* cited by examiner

Primary Examiner—William E. Tapolcai

(57) ABSTRACT

A refrigerated container dispenser for positioning below the passenger seat of a tractor trailer cab provides easy accessibility and convenience for the driver. The method of use provides manual activation of a lever whereby a refrigerated drink container is presented to the driver, preventing the necessity of stopping or diverting the driver's attention from the road. The preferred form of the container dispenser is mounted below the passenger seat and is affixed to the floor of the cab, within easy reach of the driver.

4 Claims, 4 Drawing Sheets

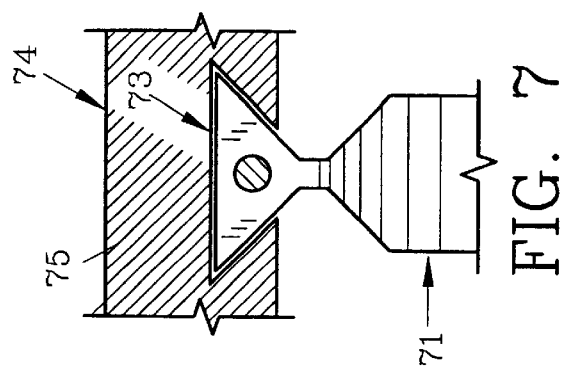
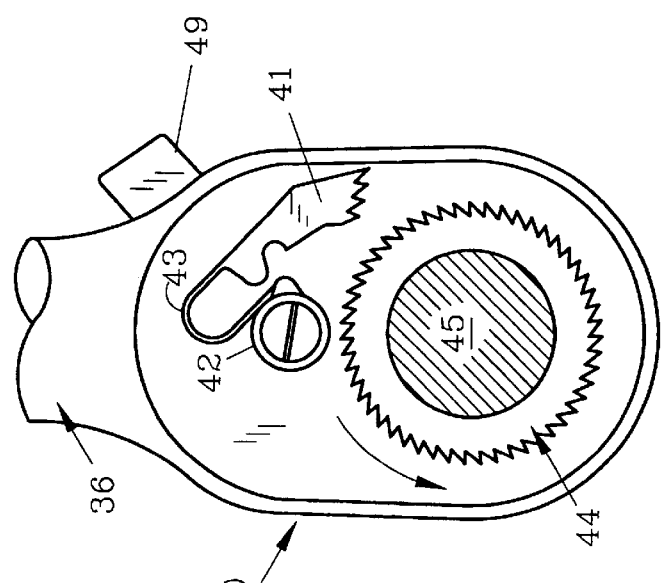
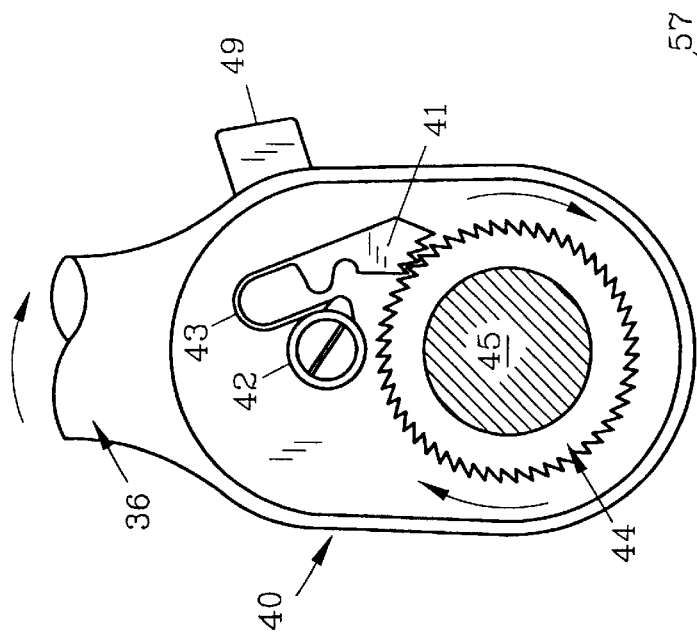
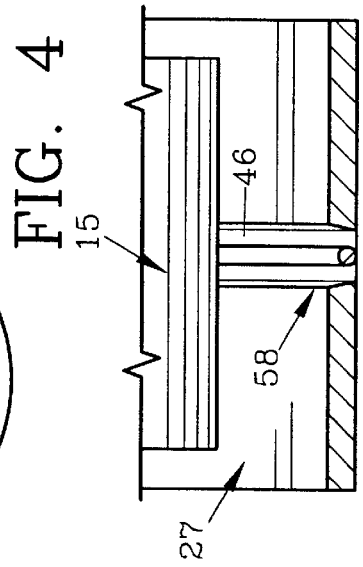
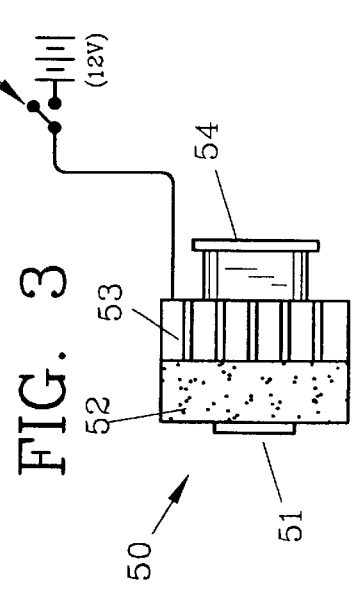

REFRIGERATED CONTAINER DISPENSER AND METHOD

This is a division of Ser. No. 09/822,148, filed Apr. 2, 2001, now U.S. Pat. No. 6,381,966.

FIELD OF THE INVENTION

The invention herein pertains to refrigerated dispensers and particularly to refrigerated dispensers for soft drink containers mounted in vehicles.

DESCRIPTION OF THE PRIOR ART AND OBJECTIVES OF THE INVENTION

Tractor trailer drivers often become tired after a few hours on the road during long hauls and frequently stop for refreshments. A few quick stops during the day can easily cost the driver hours of road time and delay shipments, even if the refreshment stands are near the road and have easy, ample parking for tractor trailers. To eliminate the necessity of stopping for soft drinks, some drivers utilize electric or ice filled coolers which can be placed in the cab. Unfortunately, such portable coolers often slide or move, requiring the driver to take his eyes off the road as he retrieves a soft drink therefrom, which can be extremely hazardous. Also, such portable coolers can become dangerous missiles if a sudden stop is needed. Thus, with the problems and disadvantages of conventional refreshment methods, the present invention was conceived and one of its objectives is to provide a refrigerated drink container dispenser which is permanently situated in a location beneath the passenger seat convenient to the driver and within easy reach.

It is yet another objective of the present invention to provide a fixed container dispenser which is easy to load and operate by the tractor trailer driver.

It is yet another objective of the present invention to provide an electric drink container dispenser which does not interfere with a passenger's leg room.

It is still another objective of the present invention to provide an electric drink container dispenser which can be easily and safely operated by the driver while the tractor trailer is in motion on the road.

It is a further objective of the present invention to provide a drink container dispenser which will hold a plurality of drink containers for consumption while on extended trips.

It is yet a further objective of the present invention to provide a refrigerated container dispenser which has a rachet mechanism for dispensing one drink container at a time as needed.

Various other objectives and advantages of the present invention will become apparent to those skilled in the art as a more detailed description is set forth below.

SUMMARY OF THE INVENTION

The aforesaid and other objectives are realized by providing a refrigerated container dispenser for attachment in the cab of a conventional tractor trailer and is situated in easy reach of the seated driver. A lever is manually operated to dispense a beverage container as desired. The refrigerated container has a thermoelectric cooling assembly which is powered by 12v DC and is conveniently mounted beneath the passenger seat in a stable, out of the way location. A plurality of beverage containers such as twelve ounce soft drink cans are loaded into the refrigerated dispenser which includes a hinged door facing the driver's seat. The tractor trailer driver can simply actuate the lever and readily obtain a soft drink or the like without the necessity of stopping or removing his eyes from the road.

BRIEF DESCRIPTION OF THE DRAWINGS

FIG. 3 depicts an enlarged, exposed view of the rachet assembly with the release lever in a downward posture;

FIG. 4 shows the rachet assembly as seen in FIG. 3 but with the release lever raised;

FIG. 5 illustrates a view of the dispenser slide as seen along lines 5—5 in FIG. 1;

FIG. 7 demonstrates a partial front, enlarged view of the guide as seen in FIG. 6; and FIG. 8 shows a schematic view of the preferred refrigeration assembly.

DETAILED DESCRIPTION OF THE PREFERRED EMBODIMENTS AND OPERATION OF THE INVENTION

Figure 1:
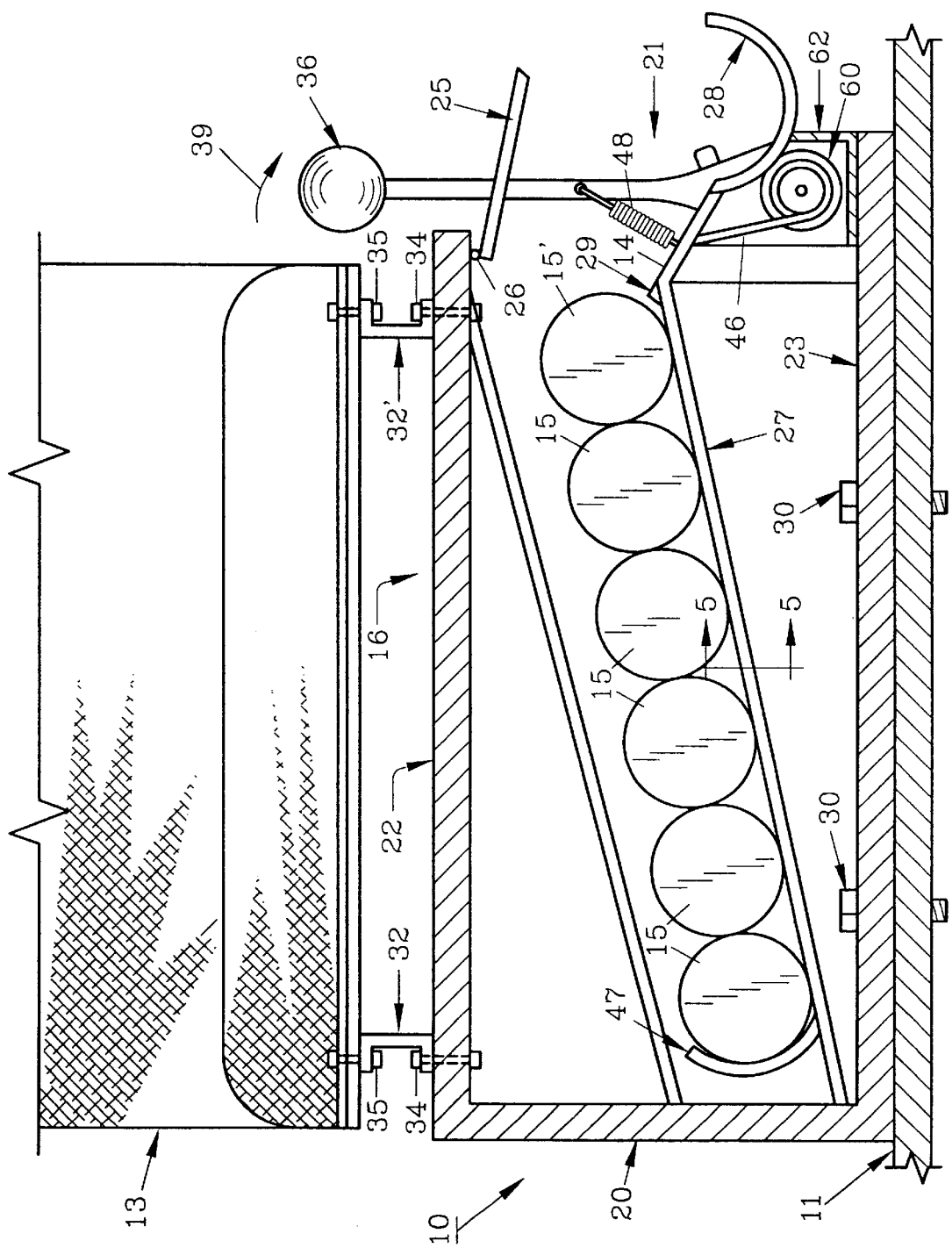
FIG. 1 demonstrates a front cut-away view of the preferred embodiment of the refrigerated container dispenser.

For a better understanding of the invention and its operation, turning now to the drawings, FIG. 1 demonstrates a cross-sectional view of preferred refrigerated container dispenser 10 which is mounted on floor 11 beneath passenger seat 13 inside a typical tractor trailer cab. Seat 13 represents the passenger seat which is to the immediate right of the seated driver (not seen) in the cab to allow easy access of refrigerated container dispenser 10 by the tractor trailer driver while the tractor trailer is in motion, such as while transporting freight along a highway. Preferred refrigerated container dispenser 10 provides a single column of six soft drink containers 15, 15' although two or more columns or longer columns could be utilized if desired. Containers 15, 15' demonstrate the bottoms of typical twelve fluid ounce aluminum cans of a soft drink, fruit juice, water, tea or the like.

Figure 2:
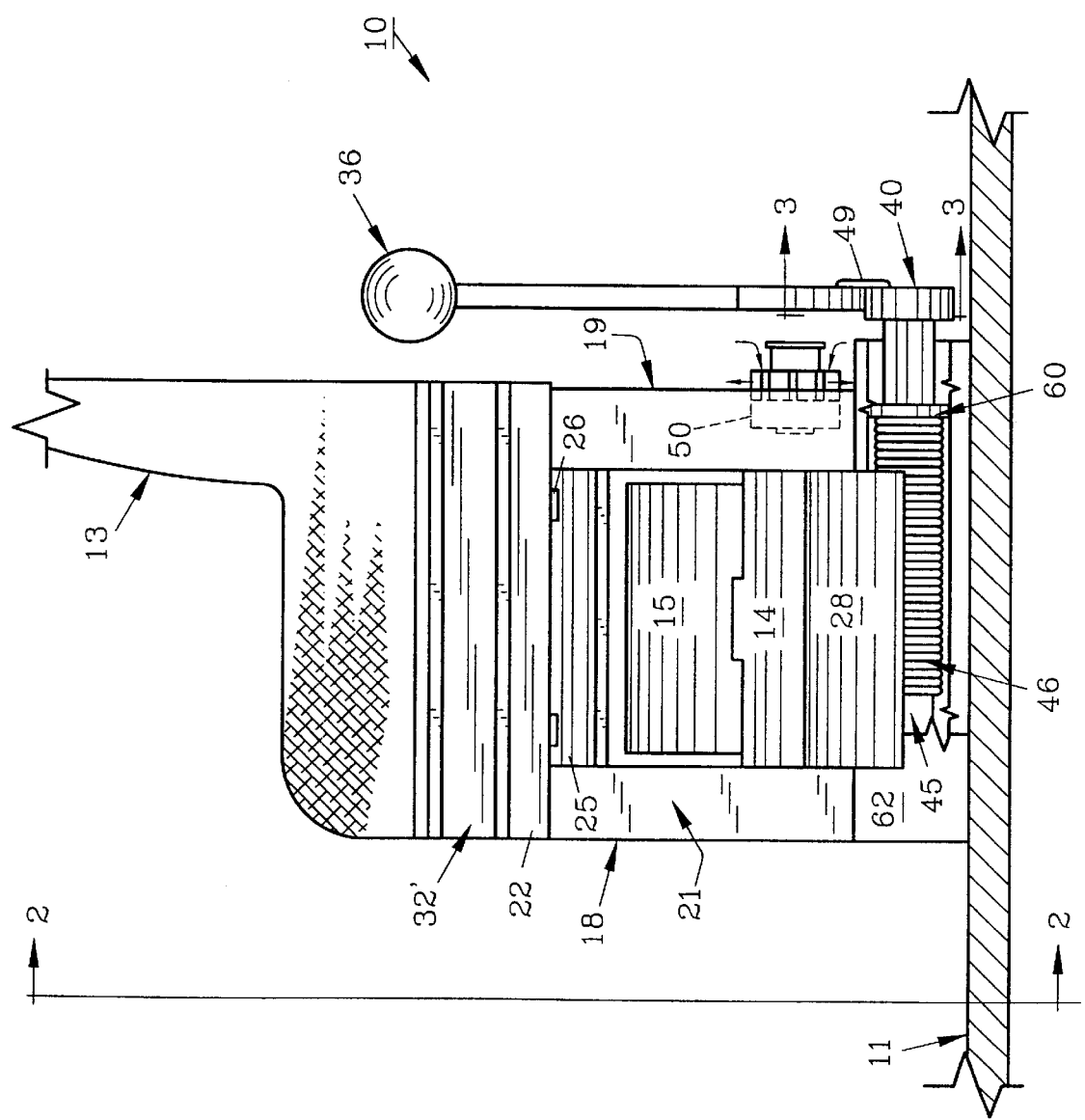
FIG. 2 shows a right (driver's) side view of the container dispenser as shown in FIG. 1.

Housing 16 illustrates a conventional insulated housing as used for refrigerators, coolers and the like as are well known in trade and includes front 18 as shown in FIG. 2, rear 19, left side 20, right (driver's) side 21, top 22 and bottom 23, all rigidly joined to form housing 16. Door 25 is attached by hinge 26 to top 22 as shown in FIG. 1 to allow container 15' to urge the same open during dispensing, or manually during loading.

Cans 15, 15' are positioned on slide 27 angled within housing 16 for movement therealong. Stop 29 prevents containers 15, 15' from inadvertently exiting past door 25 for example, should the tractor trailer encounter a rough or uneven roadway. Container dispenser 10 is preferably affixed to passenger cab floor 11 such as by bolts 30 shown in FIG. 1 although other means for fastening container dispenser 10 therein could be employed such as screws, rivets, or by permanently fixed such as by welding or the like. Passenger seat 13 is affixed to top 22 of container dispenser 10 such as by the use of rails 32, 32' shown in FIG. 1 with bolts 34, 35 respectively to top 22 of container dispenser 10 and to the bottom of seat 13.

Lever 36 is used by the tractor trailer driver (not seen) to dispense containers 15, 15' as needed. Lever 36 is pulled towards the driver as seen by arrow 39 in FIG. 1 which in turn causes conventional rachet assembly 40 (shown exposed and enlarged in FIGS. 3 and 4) to rotate. Other standard rachet assemblies could also be used. Pawl 41 in FIG. 3 is resiliently attached to tubular member 42 by spring section 43 which biases pawl 41 into engagement with rachet wheel 44. Thus, when lever 36 is pulled in a clockwise direction as shown in FIG. 3, pawl 41 rotates rachet wheel 44 which is rigidly affixed to reel shaft 45. Reel shaft 45 turns with rachet wheel 44 causing guideline 46 (FIG. 1) to urge guide 47 from left to right along slide 27 thereby causing drink container 15' to transgress stop 29, forcing door 25 to an open position and allowing container 15' to roll down chute 14 where it comes to rest in U-shaped container catch 28. The driver releases lever 36 and it returns to its upright position as shown in FIG. 1 by spring 48. Door 25 returns to its normal (vertical) closed position after container 15' passes by. The driver easily retrieves container 15' from catch 28 without the necessity of stopping the tractor trailer or removing his eyes from the roadway ahead due to its convenient location.

Drink containers 15, 15' are maintained in a cold, refrigerated condition by refrigeration assembly 50 as shown in FIGS. 2 and 8 within housing 16. Refrigeration assembly 50 is preferably a 12V DC thermoelectric module such as Model No. CZ1-1.4-127-1.14 as manufactured by Tellurex Corporation of Traverse City, Mich. While a Peltier or thermoelectric refrigeration assembly is preferred, conventional refrigeration assemblies could likewise be used. As seen in FIG. 8, preferred refrigeration assembly 50 includes cold plate 51, foam insulation layer 52, heat sink 53 and air intake fan 54 and switch 57. Switch 57 allows refrigeration assembly 50 to be turned off during idle times when the tractor trailer is parked for long periods or otherwise not in use, to prevent battery damage.

The movement of cans 15 along slide 27 for dispensing be repeated as desired by manually operating lever 36. Guideline 46 consists preferably of a conventional nylon cord approximately one-quarter inch (0.63 mm) in diameter and is attached to the bottom of guide 47. As seen in FIG. 5, guideline 46 is contained within channel 58 of slide 27. Channel 58 has a depth slightly larger than the diameter of guideline 46 to allow container 15 to easily roll thereover along slide 27. Channel 58 continues the length of slide 27 and guideline 46 passes through (or under) chute 14 and is wound on reel 60 and lever 36 is actuated.

The preferred method of utilizing refrigerated container dispenser 10 includes the steps of attaching dispenser 10 to floor 11 of the tractor trailer cab such as by bolts 30 or the like. Rails 32, 32' as shown in FIG. 1 are then affixed such as by bolting to the top of container 22 and thereafter, seat 13 is likewise bolted to rails 32, 32'. Containers 15, 15' are then loaded into refrigerated container dispenser 10 by manually lifting door 25 and inserting drink containers 15, 15' therein after moving rachet release lever 49 as shown in FIG. 4 to its upward position. By rotating lever 49 upwardly (as shown in FIG. 4), pawl 41 disengages rachet wheel 44, allowing rachet wheel 44 to freely rotate in a counterclockwise direction, permitting reel shaft 45 to thus unwind guideline 46 from reel 60 as guide 47 is urged rearwardly (right to left as shown in FIG. 1) as drink containers 15, 15' are loaded. Once the desired number of drink containers 15 are loaded onto slide 27 (with door 25 held open), release lever 49 is urged downwardly, to its active position as shown in FIG. 3 with rachet assembly 40 again ready for use. Reel 60 seen in FIGS. 1 and 2 is rigidly affixed to reel shaft 45 and is contained within reel housing 62. Reel housing 62 is affixed to front 18 of housing 16.

Figure 6:
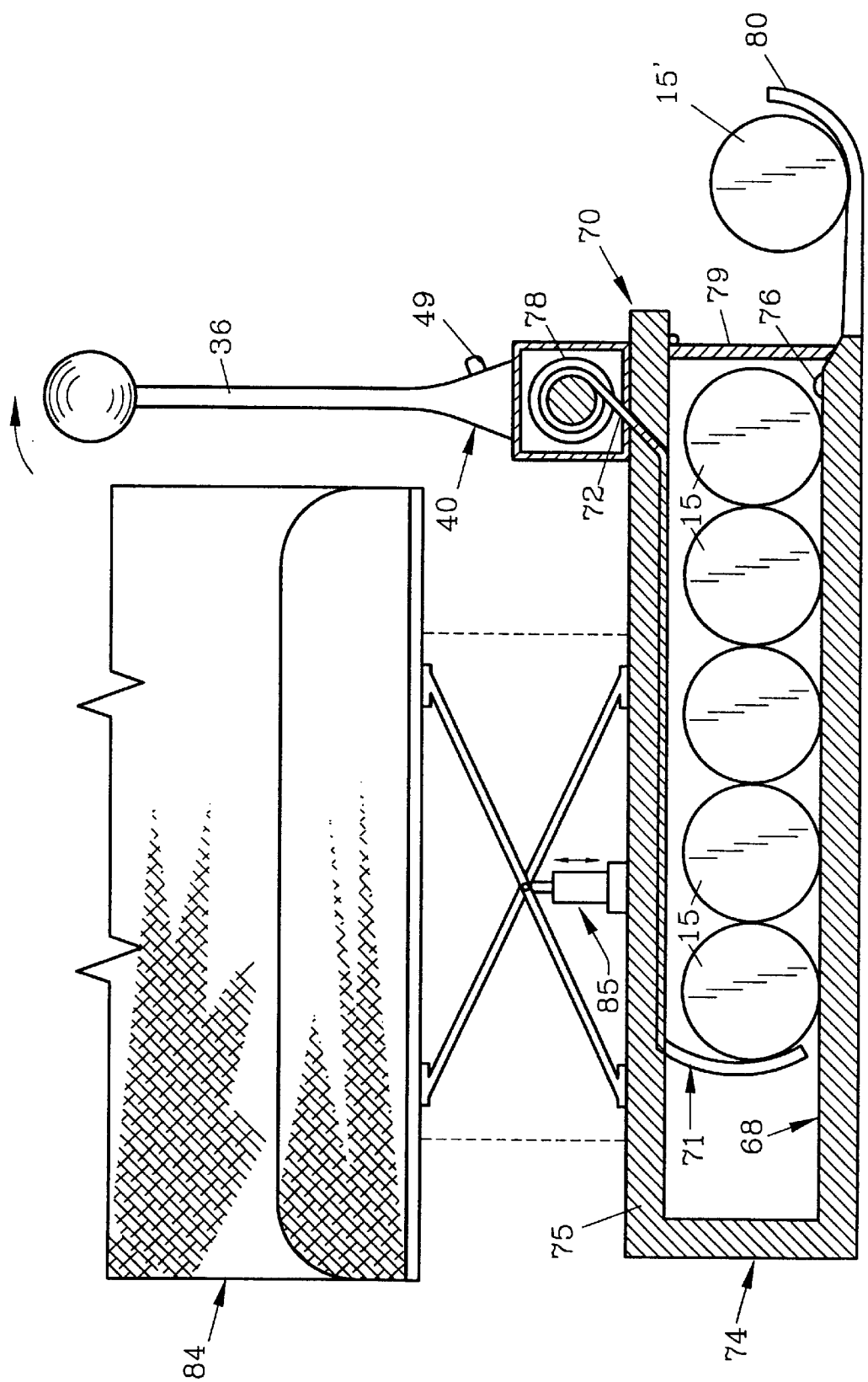
FIG. 6 pictures an alternate embodiment of the container dispenser.

An alternate embodiment of the invention is seen in a partial cross-sectional view in FIG. 6 whereby refrigerated container dispenser 70 is shown for bolting or otherwise affixing to the floor of a tractor trailer cab, in convenient reach of the seated driver. Refrigerated container dispenser 70 includes movable guide 71 which is attached to guideline 72 for movement within channel 73 in top 75 of housing 74 (FIG. 7). Guideline 72 passes upwardly through top 75 onto reel 78 which is affixed, as in the preferred embodiment earlier discussed, to rachet assembly 40. Lever 36 can then be manually actuated to wind reel 78 causing container guide 71 to move in a left to right direction as shown in FIG. 6 to deliver (roll) container 15' along side 68 of housing 74, past hinged door 79 and stop 76 into catch 80 where it rests, for the tractor trailer driver to easily reach while in his seat during driving. Slide 68 is the smooth floor of housing 74 as seen in FIG. 6 for containers 15, 15'.

Passenger seat 84 is shown affixed atop housing 74 with conventional pneumatic assembly 85. Pneumatic assembly 85 allows passenger seat 84 to be raised and lowered as is standard in the industry. The operation and method of use of refrigerated container dispenser 70 is similar to that as explained earlier with preferred refrigerated dispenser container 10 and also includes a refrigeration unit (not shown) as previously described for maintaining drink containers 15, 15' in a cold condition.

Modifications could be made to the disclosed invention such as by using an electric motor in place of a manual rachet assembly 40 as seen in FIG. 1. A push-button type switch could be employed to activate the motor which in turn would drive reel shaft 45 as seen in FIG. 2. Thus, the illustrations and examples provided herein are merely for explanatory purposes and are not intended to limit the scope of the appended claims.

I claim:

1. A method of storing containers in a vehicle for dispensing comprising the steps of:
    a) attaching a dispenser to the floor in the passenger compartment of a vehicle;
    b) attaching a seat to the dispenser; and
    c) removing a container from the dispenser by actuating a lever.

2. The method of claim 1 further comprising the step of loading containers into the dispenser.

3. The method of claim 1 wherein attaching a dispenser comprises the step of attaching a refrigerated dispenser to the floor of a passenger compartment under the passenger seat.

4. The method of claim 2 wherein loading containers comprises the step of manually loading beverage cans into the dispenser.

* * * * *